(12) United States Patent
Tsurumi

(10) Patent No.: US 11,928,072 B2
(45) Date of Patent: Mar. 12, 2024

(54) CONTROLLER AND MEMORY SYSTEM

(71) Applicant: Kioxia Corporation, Tokyo (JP)

(72) Inventor: Hiroshi Tsurumi, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 89 days.

(21) Appl. No.: 17/685,982

(22) Filed: Mar. 3, 2022

(65) Prior Publication Data

US 2023/0107127 A1 Apr. 6, 2023

(30) Foreign Application Priority Data

Sep. 17, 2021 (JP) ................................. 2021-152531

(51) Int. Cl.
*G06F 13/42* (2006.01)
*G06F 1/10* (2006.01)

(52) U.S. Cl.
CPC ............ *G06F 13/4221* (2013.01); *G06F 1/10* (2013.01); *G06F 2213/0026* (2013.01)

(58) Field of Classification Search
CPC . G06F 13/4221; G06F 1/10; G06F 2213/0026
See application file for complete search history.

(56) References Cited

U.S. PATENT DOCUMENTS

| | | | |
|---|---|---|---|
| 10,467,111 B2 | 11/2019 | Arroyo et al. | |
| 10,474,612 B1* | 11/2019 | Guevara | G06F 9/4411 |
| 10,817,443 B2 | 10/2020 | Mao et al. | |
| 2012/0204079 A1 | 8/2012 | Takefman et al. | |
| 2013/0346653 A1* | 12/2013 | Freking | G06F 9/4411 |
| | | | 710/104 |
| 2018/0217957 A1* | 8/2018 | Zhu | G06F 13/4004 |
| 2020/0042471 A1 | 2/2020 | Kerr et al. | |
| 2020/0084881 A1* | 3/2020 | Lee | H05K 1/181 |
| 2021/0132856 A1 | 5/2021 | Chen | |
| 2021/0263875 A1 | 8/2021 | Lin | |
| 2023/0169027 A1* | 6/2023 | Kim | G06F 13/4022 |
| | | | 710/316 |

FOREIGN PATENT DOCUMENTS

JP 2012-022463 A 2/2012

* cited by examiner

*Primary Examiner* — Glenn A. Auve
(74) *Attorney, Agent, or Firm* — Foley & Lardner LLP

(57) ABSTRACT

A controller includes a physical layer interface circuit configured to support a first port and a second port both conforming to a PCIe standard, the first port including a first number of lanes with a first order, the second port including a second number of lanes with a second order, and the first number of lanes and the second number of lanes being connected to the physical layer interface circuit via traces arranged in an order in which at least a part of the first order and at least a part of the second order are changed based on Lane Reversal conforming to the PCIe standard.

20 Claims, 6 Drawing Sheets

CONTROLLER AND MEMORY SYSTEM

CROSS-REFERENCE TO RELATED APPLICATION(S)

This application is based upon and claims the benefit of priority from Japanese Patent Application No. 2021-152531, filed Sep. 17, 2021, the entire contents of which are incorporated herein by reference.

FIELD

Embodiments described herein relate generally to a controller and a memory system.

BACKGROUND

A solid state drive (SSD) as a part of a memory system incorporating nonvolatile memory such as NAND flash memory has been proposed. With an increase in data capacity of the memory system, the number of packages of the nonvolatile memory incorporated in the SSD is increasing. Accordingly, there is demand for a memory system continued to be optimized to achieve miniaturization and higher speed.

DETAILED DESCRIPTION

Embodiments provide a controller and a memory system that can achieve miniaturization and speedup.

In general, according to one embodiment, a controller includes a physical layer interface circuit configured to support a first port and a second port both conforming to a PCIe standard, the first port including a first number of lanes with a first order, the second port including a second number of lanes with a second order, and the first number of lanes and the second number of lanes being connected to the physical layer interface circuit via traces arranged in an order in which at least a part of the first order and at least a part of the second order are changed based on Lane Reversal conforming to the PCIe standard. The controller includes first and second PCIe media access control (MAC) layer circuits that are provided for the first port and the second port, respectively, and connect to the physical layer interface circuit based on the Lane Reversal. The controller includes a signal processing circuit including: a first terminal configured to receive a part of signals of first auxiliary signal lines different from first signal lines corresponding to the first number of lanes, the first auxiliary signal lines transmitting Sideband signals of the first port; and a second terminal configured to receive a part of signals of second auxiliary signal lines different from second signal lines corresponding to the second number of lanes, the second auxiliary signal lines transmitting Sideband signals of the second port. The controller includes a switching circuit configured to switch between a first trace and a second trace for the first and second terminals of the signal processing circuit based on the Lane Reversal, the first trace configured for the part of the signals of the first auxiliary signal lines, the second trace configured for the part of the signals of the second auxiliary signal lines and configured to switch, based on the Lane Reversal between a trace for another part of the signals of the first auxiliary signal lines and a trace for another part of the signals of the second auxiliary signal lines between the physical layer interface circuit and the first and second PCIe MAC layer circuits.

Hereinafter, an embodiment will be described with reference to the drawings.

Figure 1:
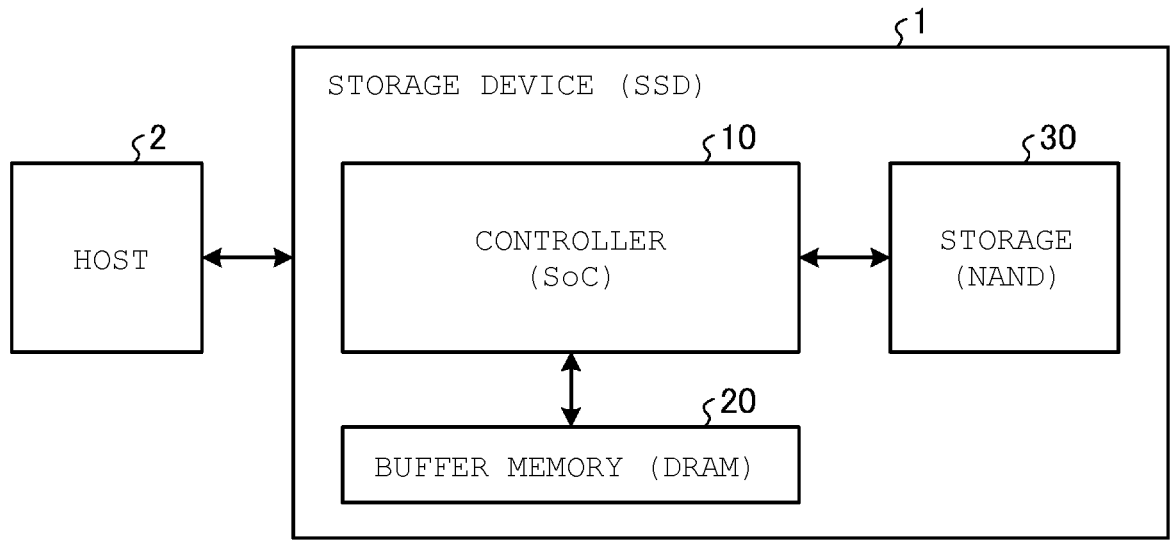
FIG. 1 is a diagram showing one configuration example of a storage device according to an embodiment.

FIG. 1 is a diagram showing one configuration example of a storage device 1 according to the embodiment. In the present embodiment, it is assumed that the storage device 1, which is a memory system, is implemented as a solid state drive (SSD).

As shown in FIG. 1, the storage device 1 includes a controller 10, a buffer memory 20, and a storage 30. The storage device 1 is connectable to a host 2 via an interface adhering to the PCI-Express™ (also called PCIe™) standard, for example.

The storage device 1 is an enterprise SSD. The storage device 1 is one example of a memory system having a configuration in which the storage 30 and the controller 10 are mounted on a printed circuit board 12 (see FIG. 2). The storage device 1 includes a connector portion 14 (see FIG. 2) whose terminals are traces provided on the printed circuit board 12, and can function as a removable SSD that can be attached to a connector (also called a card connector) inside the host 2.

The host 2 may be, for example, a storage system, an information processor such as a server or a personal computer, a mobile telephone, a digital camera, an imaging device, a portable terminal such as a tablet computer or a smartphone, a game device, or an in-vehicle terminal such as a car navigation system.

The buffer memory 20 is dynamic random access memory (DRAM), for example. The buffer memory 20 functions as working memory of the controller 10. The buffer memory 20 may be SRAM. The buffer memory 20 may be built in the controller 10.

The storage 30 is NAND flash memory, for example. The storage 30 includes at least one semiconductor memory chip. The storage 30 may be another semiconductor memory. In one example, the storage 30 is magnetoresistive RAM (MRAM: magnetoresistive memory), ferroelectric RAM (FeRAM: ferroelectric memory), phase change RAM (PRAM: phase change memory), resistive RAM (RRAM: resistive nonvolatile memory) or the like.

The controller 10 is a chip component in which functional portions such as a central processing unit (CPU) serving as the center of a computer, memory storing firmware that runs the CPU, and an I/O circuit are integrated. The controller 10 is configured as a System On a Chip (SoC), for example.

The controller 10 receives a command (in one example, a Write Command or a Read Command) from the host 2. In response to the received command, while using the buffer memory 20 as a temporary data storage area, the controller 10 executes a process of writing data transferred from the host 2 into the storage 30 or a process of reading data requested by the host 2 from the storage 30. That is, the controller 10 controls the storage 30 based on the command from the host 2.

Figure 2:
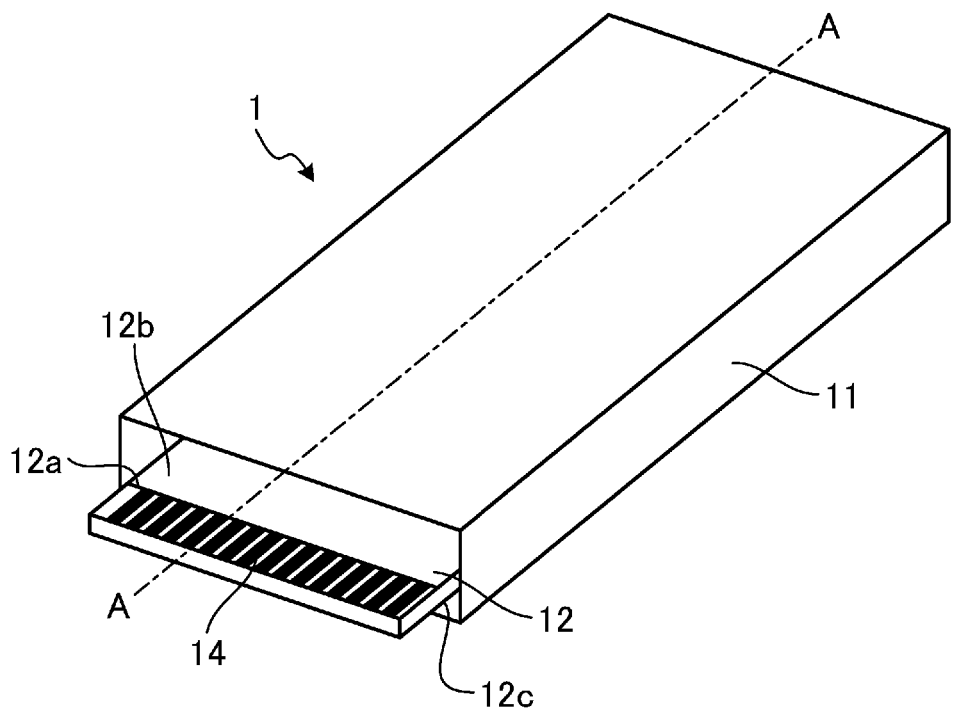
FIG. 2 is a perspective view showing one example of an appearance of the storage device.
Figure 3:
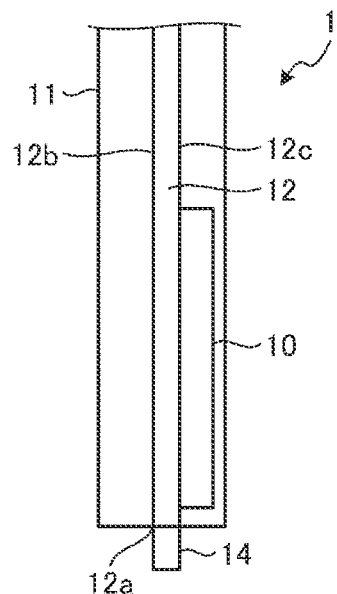
FIG. 3 is a sectional view showing one example of the storage device.

FIG. 2 is a perspective view showing one example of an appearance of the storage device 1 and FIG. 3 is a sectional view showing one example of the storage device 1. FIG. 3 shows a part of a cross section A-A in FIG. 2. As shown in FIGS. 2 and 3, the storage device 1 includes a box-shaped housing 11.

Moreover, the storage device 1 includes the roughly rectangular printed circuit board (hereinafter referred to simply as the board) 12. The board 12 may have a single-layer structure. the board 12 may have a multilayer structure formed by stacking synthetic resin such as epoxy resin. Wiring patterns of various shapes are formed on a surface of each layer. For example, a layer on which a signal line performing signal transmission and reception is placed, a layer on which ground wiring serving as a reference potential of the controller 10 and the storage 30, for example, is placed, a layer on which wiring serving as a power supply potential of the controller 10 and the storage 30, for example, is placed, and so forth may be formed.

The connector portion 14 is provided at an end 12a of the board 12 located on one short side thereof. The board 12 has a front surface (one example of a first surface) 12b and a rear surface (one example of a second surface) 12c which is a surface opposite to the front surface 12b. The connector portion 14 includes a plurality of terminals which are provided on the front surface 12b of the board 12 and a plurality of terminals which are provided on the rear surface 12c. A part of the wiring pattern (which is not shown in FIGS. 2 and 3) formed on or in the board 12 is electrically connected to each terminal of the connector portion 14. Each terminal of the connector portion 14 is formed of a trace formed on the board 12. That is, the connector portion 14 is formed as an edge connector. The connector portion 14 is connected to a connector (which is not shown in FIGS. 2 and 3) on a circuit board of the host 2 directly or via a cable. Consequently, the storage device 1 is electrically connected to the host 2.

As shown in FIG. 3, the board 12 and the controller 10 are provided inside the housing 11. Though not shown in FIG. 3, the buffer memory 20 and the storage 30 are also provided inside the housing 11.

As shown in FIG. 3, the controller 10 is mounted on the rear surface 12c of the board 12, which is a surface opposite to the plurality of terminals provided on the front surface 12b of the board 12.

The board 12, the controller 10, the buffer memory 20, and the storage 30 are provided inside the housing 11 in this manner, which makes it possible to protect these components and other circuit components mounted on the board 12 from structural damage, an electrical short circuit, static electricity and so forth.

The reason why the controller 10 is mounted on the rear surface 12c of the board 12 in the storage device 1 will be described below.

There is the U.2 standard defining connection specifications conforming to the PCIe standard which applies to the SSD and the like. According to the U.2 standard, restrictions on the height of a space inside a housing of a storage device are not very severe, which allows a controller to be mounted on the front surface (the first surface) of a printed circuit board.

Moreover, in the U.2 standard, to achieve fast transfer on the order of a few GHz which is performed by a PCIe interface, terminals (pins) of a PCIe interface of a SoC in which a plurality of parts (systems) including a CPU, which are necessary for control, are integrated in one chip are arranged in a pattern (a parallel pattern) in which pattern crossing does not occur.

On the other hand, Enterprise and Data Center SSD Form Factor (EDSFF) has been recently designed as a new standard. According to the EDSFF standard, restrictions on the height of a space inside a housing of a storage device are severer than those of the U.2 standard for miniaturization of storage devices.

Thus, in the storage device 1 of the present embodiment, by mounting the controller 10 and so forth on the rear surface 12c of the board 12 where height restrictions are not very severe even in the EDSFF standard, a problem associated with height restrictions is avoided. Mounting the controller 10 and so forth on the rear surface 12c of the board 12 will probably improve heat dissipation efficiency, which also advantageously facilitates cooling.

Figure 4:
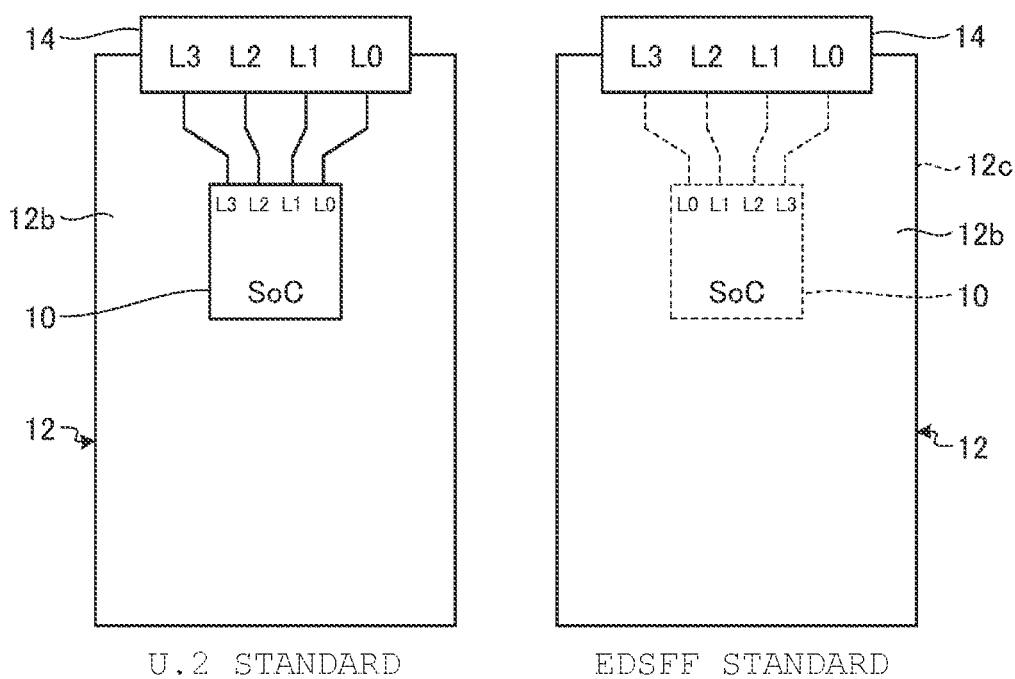
FIG. 4 is a diagram showing an example of lane numbers which are observed when a controller is mounted on a rear surface of a board.

FIG. 4 is a diagram showing an example of lane numbers which are observed when the controller 10 is mounted on the rear surface 12c of the board 12. The diagram shown in FIG. 4 illustrates a comparison of an example in which the controller 10 is assumed to be placed on the rear surface 12c of the board 12 in the EDSFF standard and an example in which the controller 10 is placed on the front surface 12b of the board 12 in the U.2 standard. In FIG. 4, numerals placed after L in lanes L0 to L3 represent lane numbers in the PCIe interface standard. The lanes L0 to L3 each include a plurality of signal lines, which are not shown in FIG. 4. As shown in FIG. 4, when the controller 10 with the terminals arranged in a parallel pattern (in this example, a lane order) so as to conform to the PCIe interface U.2 standard is mounted on the rear surface 12c of the board 12, the lane numbers of the signal lines between the connector portion 14 and the controller 10 are reversed.

On the other hand, the signal lines of the PCIe interface support Lane Reversal which is a lane order change function conforming to the PCIe standard. This allows the traces of the signal lines of the PCIe interface to function as a Lane Reversal pattern when the controller 10 is mounted on the rear surface 12c of the board 12. Lane Reversal allows logic inversion of the order of the lane numbers of the signal lines, thereby increasing flexibility of a board layout and reducing the number of signal lines which need to cross each other in the traces on the printed circuit board.

Thus, the storage device 1 of the present embodiment connects between the connector portion 14 and the controller 10 using Lane Reversal conforming to the PCIe standard.

Figure 5:
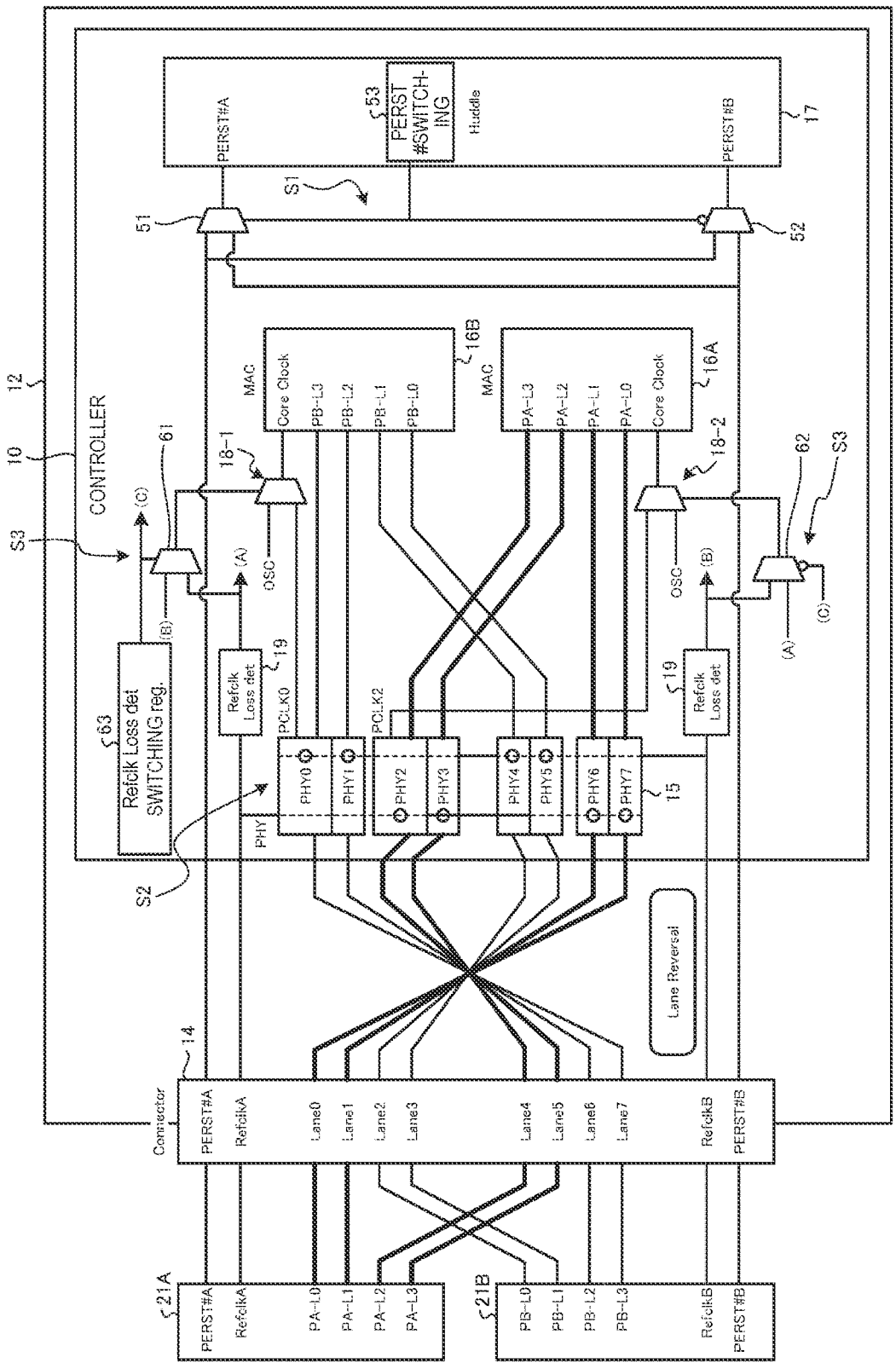
FIG. 5 is a diagram showing an internal configuration example of the controller of the storage device.

FIG. 5 is a diagram showing an internal configuration example of the controller 10 of the storage device 1. As shown in FIG. 5, the storage device 1 is a device (hereinafter referred to as a Dual Port device) that supports Dual Port of the PCIe standard. That is, the storage device 1 is connectable to the host 2 via two ports. Access to the storage device 1 from the host 2 can be made via the two ports, each having four lanes. In FIG. 5, the host 2 includes a host port 21A which is a first port and a host port 21B which is a second port. PA-L0 to PA-L3 and PB-L0 to PB-L3 each represent one lane of a transmission path provided in each port.

As shown in FIG. 5, the connector portion 14 of the storage device 1 and the host port 21A and the host port 21B of the host 2 are connected with a part of the lane order changed in accordance with Lane Reversal of the PCIe standard. Specifically, as shown in FIG. 5, PA-L2 of the host port 21A is connected to a lane 4 of the connector portion 14, PA-L3 of the host port 21A is connected to a lane 5 of the connector portion 14, PB-L0 of the host port 21B is connected to a lane 2 of the connector portion 14, and PB-L1 of the host port 21B is connected to a lane 3 of the connector portion 14.

As shown in FIG. 5, the controller 10 includes a physical layer interface circuit 15 which is implemented as a standard physical layer (PHY) of the PCIe standard, a MAC 16A which is a first PCIe media access control (MAC) layer circuit corresponding to the host port 21A, and a MAC 16B which is a second PCIe MAC layer circuit corresponding to the host port 21B. A Huddle 17 is a CPU peripheral logic circuit which is provided in the controller 10.

The physical layer interface circuit 15 connects to the lanes of the connector portion 14 via a plurality of signal lines using Lane Reversal conforming to the PCIe standard. The plurality of signal lines transmit signals conforming to the PCIe standard. Each lane includes a transmission/reception differential pair for performing two-way communications. In the PCIe standard, a transmission differential signal TX and a reception differential signal RX are assigned to any terminals of a plurality of terminals of each lane. By using the transmission differential signal TX and the reception differential signal RX, it is possible to perform two-way communications.

The MAC 16A and the MAC 16B are provided for the host port 21A and the host port 21B, respectively. The MAC 16A and the MAC 16B connect to the physical layer interface circuit 15 using Lane Reversal conforming to the PCIe standard and control access to the storage 30.

Moreover, the controller 10 includes auxiliary signal lines that are provided separately from the signal lines and exchange Sideband signals. More specifically, the controller 10 includes a signal processing circuit including a first terminal that receives a part of signals of first auxiliary signal lines (auxiliary signal lines) transmitting Sideband signals of the host port 21A and a second terminal that receives a part of signals of second auxiliary signal lines (auxiliary signal lines) transmitting Sideband signals of the host port 21B. The Sideband signals of the host port 21A are different from signals of first signal lines (signal lines) corresponding to a first number of lanes to which a first order is assigned in the host port 21A. The Sideband signals of the host port 21B are different from signals of second signal lines (signal lines) corresponding to a second number of lanes to which a second order is assigned in the host port 21B.

In addition, the controller 10 includes a switching circuit that makes the auxiliary signal lines compliant with Lane Reversal which is performed between the physical layer interface circuit 15 and the MACs 16A and 16B. The switching circuit will be described below.

Figure 6:
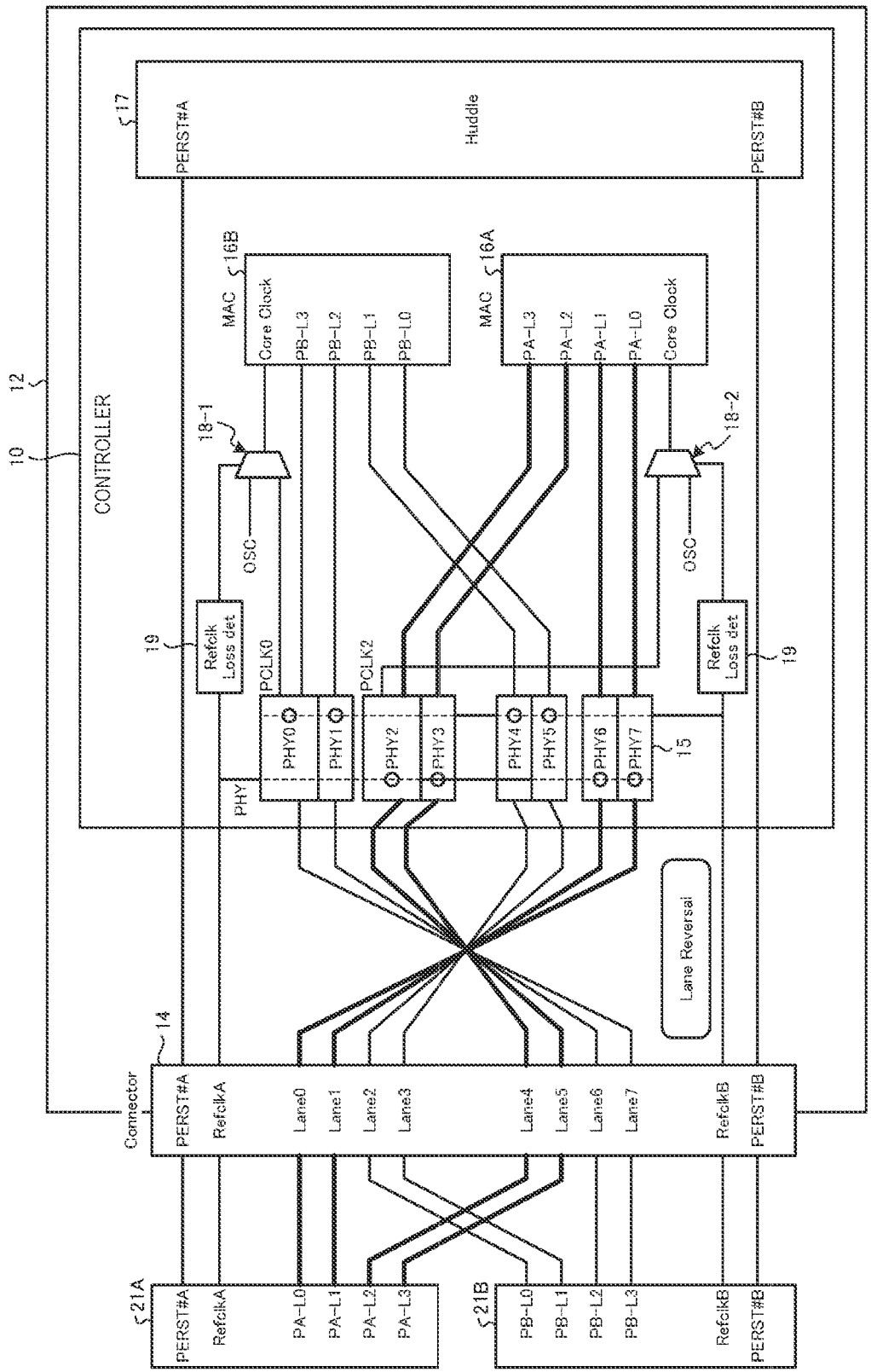
FIG. 6 is a diagram showing an example in which Lane Reversal is used in Dual Port.

The following problems arise when Lane Reversal is used in Dual Port in a Dual Port device. FIG. 6 is a diagram showing an example in which Lane Reversal is used in Dual Port. As shown in FIG. 6, when Lane Reversal is used in Dual Port, the host port 21A is connected to the MAC 16B of the controller 10 and the host port 21B is connected to the MAC 16A of the controller 10. This causes the following problems to arise:

(1) a signal PERST #, which is a Sideband signal, of the host port 21A and a signal PERST # of the host port 21B change places and are connected;

(2) a signal Refclk, which is a Sideband signal, of the host port 21A and a signal Refclk of the host port 21B change places and are connected; and (3) a PHY Interface for the PCI Express Architecture (PIPE) clock switch circuit 18, which detects a loss of a signal Refclk, provided for one Port receives a signal Refclk of the other Port.

Figure 7:
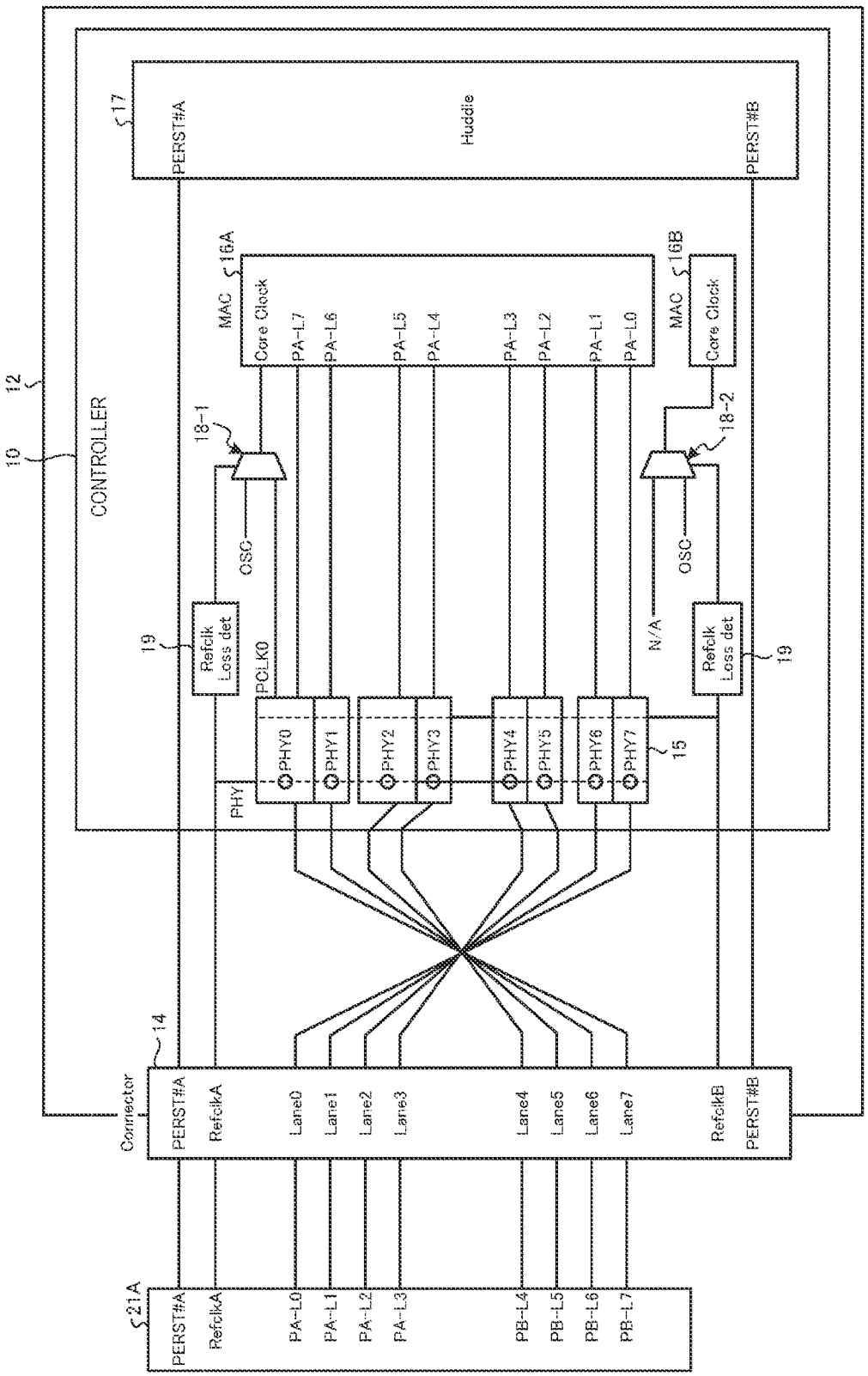
FIG. 7 is a diagram showing an example in which Lane Reversal is used in Single Port.

Moreover, an example in which Lane Reversal is used in Single Port will be described using FIG. 7. As shown in FIG. 7, when Lane Reversal is used in Single Port, Lane Reversal for one PCIe media access control (MAC) layer circuit is used. Furthermore, the number of signals PERST # which are Sideband signals is one, and the number of signals Refclk which are Sideband signals is one. Thus, even when Lane Reversal is used, it is possible to connect the host port 21A, which is Single Port, and the controller 10 without problems.

For this reason, as shown in FIG. 5, the storage device 1, which is a Dual Port device, according to the present embodiment includes the switching circuit including switch circuits S1 to S3 that switch a Sideband signal between the host port 21A and the host port 21B. This makes it possible for the storage device 1 to use Lane Reversal in Dual Port. Detailed descriptions will be given below.

The switching circuit can switch between a first trace and a second trance based on Lane Reversal. The first trace may be configured for a part of signals of the first auxiliary signal lines and for the first terminal of the signal processing circuit. The second trance may be configured for a part of signals of the second auxiliary signal lines and for the second terminal of the signal processing circuit. In addition, the switching circuit can switch between a third trace and a fourth trace between the physical layer interface circuit 15 and the MACs 16A and 16B. The third trace is configured for another part of the signals of the first auxiliary signal lines, and the fourth trace is configured for another part of the signals of the second auxiliary signal lines.

As shown in FIG. 5, the signal PERST #, which is a PCIe Sideband signal, is a reset signal of negative logic that is sent from the host 2. The signal PERST # can be used by the host 2 to reset a bus that is used for communications complying with the PCIe standard. The signal PERST # can be used by the host 2 to reinitialize the storage device 1 at the time of occurrence of an error, for example.

As shown in FIG. 5, the signal Refclk, which is a PCIe Sideband signal, is a reference differential clock signal that is sent from the host 2. The reference differential clock signal includes two differential signals forming a differential clock. The differential clock sent from the host 2 to which the storage device 1 is connected allows the storage device 1 to more efficiently synchronize signals to be transmitted between the storage device 1 and the host 2.

The switch circuit S1 provided in the switching circuit is a circuit functioning as a first circuit that switches detection of an interrupt caused by the signal PERST #, which is a Sideband signal, between the host port 21A and the host port 21B. The switch circuit S1 includes a multiplexer 51, a multiplexer 52, and a signal PERST # switching portion 53.

The multiplexer 51 includes one input terminal to which a signal PERST #A is input, the other input terminal to which a signal PERST #B is input, a control terminal that is connected to the signal PERST # switching portion 53 of the Huddle 17, and an output terminal that is connected to a terminal to which the signal PERST #A is input of the Huddle 17. The multiplexer 51 outputs the input signal PERST #A or signal PERST #B in accordance with a signal, which is input to the control terminal, from the signal PERST # switching portion 53.

The multiplexer 52 includes one input terminal to which the signal PERST #B is input, the other input terminal to which the signal PERST #A is input, a control terminal that is connected to the signal PERST # switching portion 53 of the Huddle 17, and an output terminal that is connected to a terminal to which the signal PERST #B is input of the Huddle 17. The multiplexer 52 outputs the input signal PERST #A or signal PERST #B in accordance with a signal, which is input to the control terminal, from the signal PERST # switching portion 53.

The signal PERST # switching portion 53 is one of modules that are provided in the Huddle 17. Under the control of the CPU running in accordance with the firmware, the signal PERST # switching portion 53 determines which reset signal (the signal PERST #A or the signal PERST #B) to be selected. Then, the signal PERST # switching portion 53 outputs a signal indicating the determination result to the multiplexer 51 and the multiplexer 52.

That is, the switch circuit S1 switches an output signal from the multiplexer 51 and an output signal from the multiplexer 52 based on a switching signal from the signal PERST # switching portion 53. Consequently, detection of an interrupt caused by the signal PERST # is properly switched between the host port 21A and the host port 21B.

The switch circuit S2 provided in the switching circuit is a circuit functioning as a second circuit that switches between a signal RefclkA and a signal RefclkB in the physical layer interface circuit 15. The switch circuit S2 in the physical layer interface circuit 15 is controlled by the CPU running in accordance with the firmware.

The physical layer interface circuit 15 includes physical layers (PHY0 to PHY7) corresponding to the lanes PA-L0 to PA-L3 of the host port 21A and the lanes PB-L0 to PB-L3 of the host port 21B.

The physical layer interface circuit 15 receives the signal RefclkA from the host port 21A via the connector portion 14 and receives the signal RefclkB from the host port 21B via the connector portion 14. Under the control of the CPU running in accordance with the firmware, the switch circuit S2 switches between the signal RefclkA and the signal RefclkB in the physical layer interface circuit 15.

More specifically, the physical layer interface circuit 15 turns ON a switch provided in the physical layer PHY2 of switches provided in the physical layer PHY2, the physical layer PHY3, the physical layer PHY6, and the physical layer PHY7 with which the switch circuit S2 is configured. This causes a signal PCLK2 corresponding to the signal RefclkA to be output to a PIPE clock switch circuit 18-2 from the physical layer PHY2. Moreover, the physical layer interface circuit 15 turns ON a switch provided in the physical layer PHY0 of switches provided in the physical layer PHY0, the physical layer PHY1, the physical layer PHY4, and the physical layer PHY5 with which the switch circuit S2 is configured. This causes a signal PCLK0 corresponding to the signal RefclkB to be output to a PIPE clock switch circuit 18-1 from the physical layer PHY0.

Two switch circuits S3 provided in the switching circuit are circuits, each functioning as a third circuit that switches a Refclk loss detection signal output from a corresponding Refclk Loss det 19 between the host port 21A and the host port 21B. The switch circuits S3 include a multiplexer 61, a multiplexer 62, and a detection signal switching portion 63.

Each Refclk Loss det 19 monitors a clock cycle of the signal RefclkA or the signal RefclkB. When the Refclk Loss det 19 detects that the frequency of the signal RefclkA or the signal RefclkB falls outside a given range, the Refclk Loss det 19 outputs a Refclk loss detection signal.

The multiplexer 61 includes one input terminal to which the Refclk loss detection signal for the signal RefclkB is input, the other input terminal to which the Refclk loss detection signal for the signal RefclkA is input, a control terminal that is connected to the detection signal switching portion 63, and an output terminal that is connected to a control terminal of the PIPE clock switch circuit 18-1. The multiplexer 61 outputs the input Refclk loss detection signal for the signal RefclkB or the input Refclk loss detection signal for the signal RefclkA in accordance with a signal, which is input to the control terminal, from the detection signal switching portion 63.

The multiplexer 62 includes one input terminal to which the Refclk loss detection signal for the signal RefclkA is input, the other input terminal to which the Refclk loss detection signal for the signal RefclkB is input, a control terminal that is connected to the detection signal switching portion 63, and an output terminal that is connected to a control terminal of the PIPE clock switch circuit 18-2. The multiplexer 62 outputs the input Refclk loss detection signal for the signal RefclkB or the input Refclk loss detection signal for the signal RefclkA in accordance with a signal, which is input to the control terminal, from the detection signal switching portion 63.

Under the control of the CPU running in accordance with the firmware, the detection signal switching portion 63 determines whether to select the Refclk loss detection signal for the signal RefclkB or the Refclk loss detection signal for the signal RefclkA. Then, by outputting a signal designating the loss detection signal thus determined to the multiplexer 61 and the multiplexer 62, the detection signal switching portion 63 selects a signal on the side to which switching is made by the signal PERST # switching portion 53.

The PIPE clock switch circuit 18-1 includes one input terminal to which a signal OSC, which is a synchronizing signal that is output from an oscillation circuit (an oscillator), is input, the other input terminal (i.e., a second terminal) to which PCLK0 from the physical layer interface circuit 15 is input, the control terminal that is connected to the multiplexer 61, and an output terminal that is connected to the MAC 16B.

The PIPE clock switch circuit 18-1 outputs the signal, which is input to the one input terminal or the other input terminal, to the MAC 16B in accordance with the loss detection signal that is input to the control terminal from the multiplexer 61.

The PIPE clock switch circuit 18-2 includes one input terminal to which a signal OSC, which is a synchronizing signal that is output from an oscillation circuit (an oscillator), is input, the other input terminal (i.e., a first terminal) to which PCLK2 from the physical layer interface circuit 15 is input, the control terminal that is connected to the multiplexer 62, and an output terminal that is connected to the MAC 16A.

The PIPE clock switch circuit 18-2 outputs the signal, which is input to the one input terminal or the other input terminal, to the MAC 16A in accordance with the loss detection signal that is input to the control terminal from the multiplexer 62.

That is, the switch circuits S3 switch an output signal from the multiplexer 61 and an output signal from the multiplexer 62 based on a switching signal from the detection signal switching portion 63. Consequently, the Refclk loss detection signal is properly switched between the host port 21A and the host port 21B.

As described above, according to the present embodiment, in the storage device 1 which is a Dual Port device, it is possible to mount at least the controller 10 on the rear surface 12c of the board 12 by using Lane Reversal conforming to the PCIe standard. With this configuration, according to the present embodiment, it is possible to ease height restrictions and improve heat dissipation efficiency without sacrificing transmission characteristics on the board 12.

Modification

Figure 8:
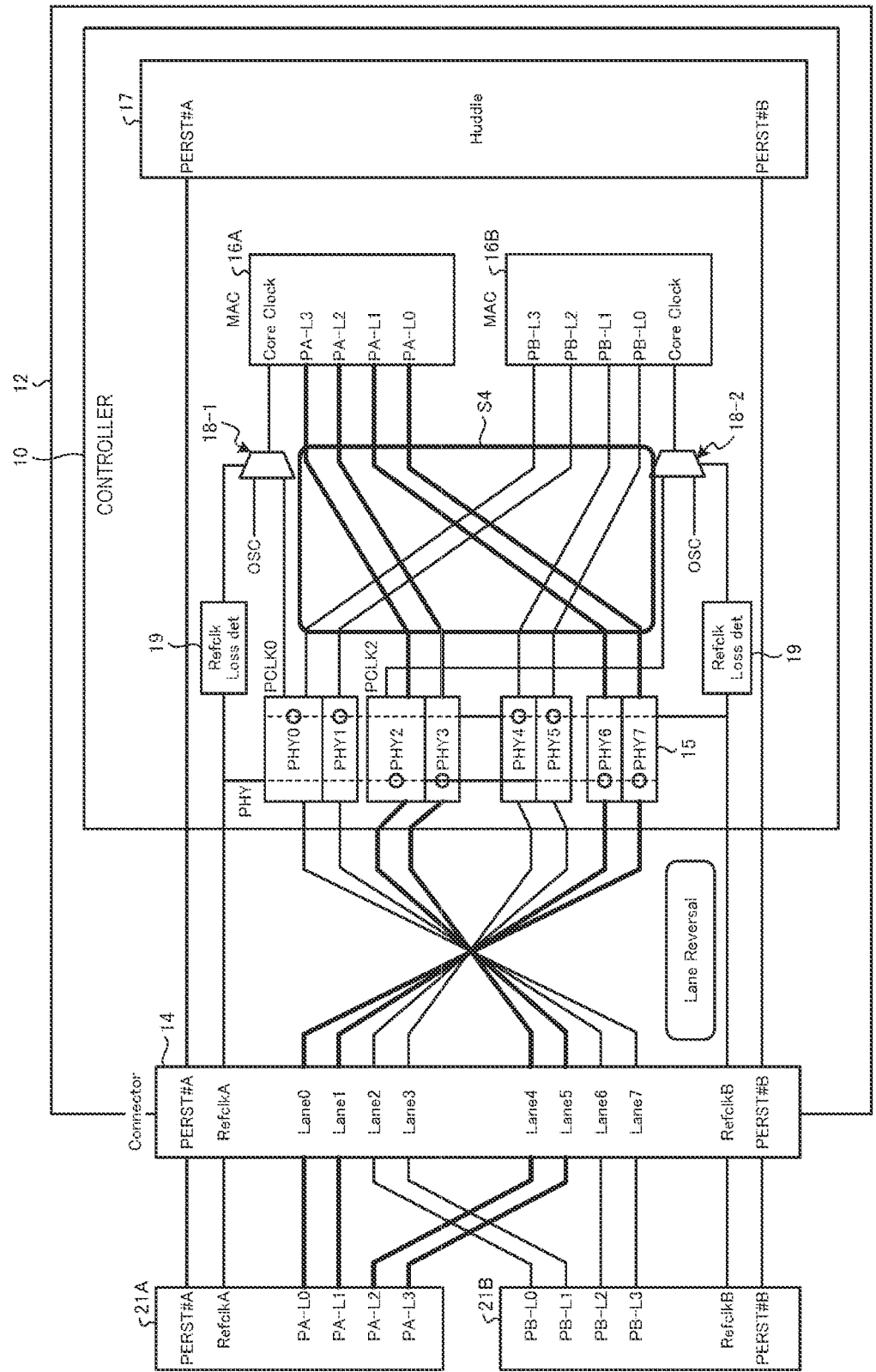
FIG. 8 is a diagram showing a configuration example of a controller of a storage device according to a modification.

FIG. 8 is a diagram showing a configuration example of a controller 10 of a storage device 1 according to a modification. As shown in FIG. 8, the storage device 1 may be provided with a Bifurcation switch circuit S4 that switches between a path from a physical layer interface circuit 15 to a MAC 16A and a path from the physical layer interface circuit 15 to a MAC 16B. The Bifurcation switch circuit S4 is a line-associated circuit with which a switching circuit is configured.

The Bifurcation switch circuit S4 includes a large number of switches using multiplexers and causes each lane connected to the physical layer interface circuit 15 to properly branch to the MAC 16A or the MAC 16B. Under the control of a CPU running in accordance with firmware, the multiplexers perform switching between the path from the physical layer interface circuit 15 to the MAC 16A and the path from the physical layer interface circuit 15 to the MAC 16B based on Lane Reversal. Specifically, the Bifurcation switch circuit S4 operates as follows based on Lane Reversal.

The Bifurcation switch circuit S4 causes a lane PB-L3, which is connected to a physical layer PHY0 of the physical layer interface circuit 15, of the host port 21B to branch to PB-L3 of the MAC 16B. The Bifurcation switch circuit S4 causes a lane PB-L2, which is connected to a physical layer PHY1 of the physical layer interface circuit 15, of the host port 21B to branch to PB-L2 of the MAC 16B. The Bifurcation switch circuit S4 causes a lane PA-L3, which is connected to a physical layer PHY2 of the physical layer interface circuit 15, of the host port 21A to branch to PA-L3 of the MAC 16A. The Bifurcation switch circuit S4 causes a lane PA-L2, which is connected to a physical layer PHY3 of the physical layer interface circuit 15, of the host port 21A to branch to PA-L2 of the MAC 16A.

Moreover, the Bifurcation switch circuit S4 causes a lane PB-L1, which is connected to a physical layer PHY4 of the physical layer interface circuit 15, of the host port 21B to branch to PB-L1 of the MAC 16B. The Bifurcation switch circuit S4 causes a lane PB-L0, which is connected to a physical layer PHY5 of the physical layer interface circuit 15, of the host port 21B to branch to PB-L0 of the MAC 16B. The Bifurcation switch circuit S4 causes a lane PA-L1, which is connected to a physical layer PHY6 of the physical layer interface circuit 15, of the host port 21A to branch to PA-L1 of the MAC 16A. The Bifurcation switch circuit S4 causes a lane PA-L0, which is connected to a physical layer PHY7 of the physical layer interface circuit 15, of the host port 21A to branch to PA-L0 of the MAC 16A.

As described above, by causing each lane, which is connected to the physical layer interface circuit 15, to properly branch to the MAC 16A or the MAC 16B using the Bifurcation switch circuit S4, even when the controller 10 is mounted on the rear surface 12c of the board 12, the lane numbers of the signal lines between the connector portion 14 and the controller 10 are not reversed.

This modification requires a large number of switches, which might result in complicated wiring in the controller 10 of a SoC. However, timing of signals can be appropriately synchronized by designing wiring with consideration given to implementation timing closure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A controller comprising:
 a physical layer interface circuit configured to support a first port and a second port both conforming to a PCIe standard, the first port including a first number of lanes with a first order, the second port including a second number of lanes with a second order, and the first number of lanes and the second number of lanes being connected to the physical layer interface circuit via traces arranged in an order in which at least a part of the first order and at least a part of the second order are changed based on Lane Reversal conforming to the PCIe standard;
 first and second PCIe media access control (MAC) layer circuits that are provided for the first port and the second port, respectively, and connect to the physical layer interface circuit based on the Lane Reversal;
 a signal processing circuit comprising: a first terminal and a second terminal, the first terminal being configured to receive a part of Sideband signals of the first port to be transmitted via first auxiliary signal lines that are different from first signal lines for the first number of lanes, and the second terminal being configured to receive a part of the Sideband signals of the second port to be transmitted via second auxiliary signal lines that are different from second signal lines for the second number of lanes; and
 a switching circuit configured to:
  switch between a first trace and a second trace for the first and second terminals of the signal processing circuit based on the Lane Reversal, the first trace configured for the part of the signals of the first auxiliary signal lines, the second trace configured for the part of the signals of the second auxiliary signal lines, and
  switch, based on the Lane Reversal, between a trace for another part of the signals of the first auxiliary signal lines and a trace for another part of the signals of the second auxiliary signal lines between the physical layer interface circuit and the first and second PCIe MAC layer circuits.

2. The controller according to claim 1,
 wherein the switching circuit comprises a first circuit configured to switch detection of an interrupt caused by a reset signal between the first port and the second port.

3. The controller according to claim 2, wherein the reset signal serves as one of the Sideband signals and is used by a host to reset a bus that is used for communications complying with the PCIe standard.

4. The controller according to claim 1,
 wherein the switching circuit comprises:
 a second circuit configured to switch a reference clock signal between the first port and the second port in the physical layer interface circuit; and
 a third circuit configured to switch a reference clock loss detection signal as one of the Sideband signals between the first port and the second port.

5. The controller according to claim 4, wherein the reference clock signal serves as one of the Sideband signal and is sent from a host.

6. A controller comprising:
a physical layer interface circuit configured to support a first port and a second port both conforming to a PCIe standard, the first port including a first number of lanes with a first order, the second port including a second number of lanes with a second order, and the first number of lanes and the second number of lanes being connected to the physical layer interface circuit via traces arranged in an order in which at least a part of the first order and at least a part of the second order are changed based on Lane Reversal conforming to the PCIe standard;
first and second PCIe media access control (MAC) layer circuits that are provided for the first port and the second port, respectively, and connect to the physical layer interface circuit based on the Lane Reversal;
a signal processing circuit comprising: a first terminal and a second terminal, the first terminal being configured to receive a part of Sideband signals of the first port to be transmitted via first auxiliary signal lines that are different from first signal lines for the first number of lanes, and the second terminal being configured to receive a part of the Sideband signals of the second port to be transmitted via second auxiliary signal lines that are different from second signal lines for the second number of lanes; and
a switching circuit configured to execute switching of paths to the first and second PCIe MAC layer circuits for the first number of lanes and the second number of lanes based on the Lane Reversal.

7. The controller according to claim 6, wherein the switching circuit comprises a first circuit configured to switch detection of an interrupt caused by a reset signal between the first port and the second port.

8. The controller according to claim 7, wherein the reset signal serves as one of the Sideband signals and is used by a host to reset a bus that is used for communications complying with the PCIe standard.

9. The controller according to claim 6, wherein the switching circuit comprises:
a second circuit configured to switch a reference clock signal between the first port and the second port in the physical layer interface circuit; and
a third circuit configured to switch a reference clock loss detection signal as one of the Sideband signals between the first port and the second port.

10. The controller according to claim 9, wherein the reference clock signal serves as one of the Sideband signal and is sent from a host.

11. A memory system comprising:
a board;
the controller according to claim 6 that is mounted on a surface of the board;
a connector portion that is provided on the board and configured to support Dual Port including the first port and the second port; and
a semiconductor memory chip that is mounted on the board;
wherein the controller is configured to control an operation of the semiconductor memory chip.

12. The memory system according to claim 11, wherein the switching circuit comprises a first circuit configured to switch detection of an interrupt caused by a reset signal between the first port and the second port.

13. The memory system according to claim 12, wherein the reset signal serves as one of the Sideband signals and is used by a host to reset a bus that is used for communications complying with the PCIe standard.

14. The memory system according to claim 11, wherein the switching circuit comprises:
a second circuit configured to switch a reference clock signal between the first port and the second port in the physical layer interface circuit; and
a third circuit configured to switch a reference clock loss detection signal as one of the Sideband signals between the first port and the second port.

15. The memory system according to claim 14, wherein the reference clock signal serves as one of the Sideband signal and is sent from a host.

16. A memory system comprising:
a board;
a connector portion that is provided on the board and configured to support Dual Port including a first port and a second port both conforming to a PCIe standard, the first port including a first number of lanes with a first order, the second port including a second number of lanes with a second order;
a semiconductor memory chip that is mounted on the board; and
a controller mounted on a surface of the board and configured to control an operation of the semiconductor memory chip,
wherein the controller comprises:
a physical layer interface circuit configured to support the Dual Port, the first number of lanes and the second number of lanes being connected to the physical layer interface circuit via traces arranged in an order in which at least a part of the first order and at least a part of the second order are changed based on Lane Reversal conforming to the PCIe standard;
first and second PCIe media access control (MAC) layer circuits that are provided for the first port and the second port, respectively, and connect to the physical layer interface circuit based on the Lane Reversal;
a signal processing circuit comprising: a first terminal and a second terminal, the first terminal being configured to receive a part of Sideband signals of the first port to be transmitted via first auxiliary signal lines that are different from first signal lines for the first number of lanes, and the second terminal being configured to receive a part of the Sideband signals of the second port to be transmitted via second auxiliary signal lines that are different from second signal lines for the second number of lanes; and
a switching circuit configured to:
switch between a first trace and a second trace for the first and second terminals of the signal processing circuit based on the Lane Reversal, the first trace configured for the part of the signals of the first auxiliary signal lines, the second trace configured for the part of the signals of the second auxiliary signal lines, and
switch, based on the Lane Reversal, between a trace for another part of the signals of the first auxiliary signal lines and a trace for another part of the signals of the second auxiliary signal lines between the physical layer interface circuit and the first and second PCIe MAC layer circuits.

17. The memory system according to claim 16, wherein the switching circuit comprises a first circuit configured to switch detection of an interrupt caused by a reset signal between the first port and the second port.

18. The memory system according to claim 17, wherein the reset signal serves as one of the Sideband signals and is used by a host to reset a bus that is used for communications complying with the PCIe standard.

19. The memory system according to claim 16, wherein the switching circuit comprises:
  a second circuit configured to switch a reference clock signal between the first port and the second port in the physical layer interface circuit; and
  a third circuit configured to switch a reference clock loss detection signal as one of the Sideband signals between the first port and the second port.

20. The memory system according to claim 19, wherein the reference clock signal serves as one of the Sideband signal and is sent from a host.

* * * * *